US009641297B2

(12) United States Patent
Jain et al.

(10) Patent No.: US 9,641,297 B2
(45) Date of Patent: May 2, 2017

(54) ENHANCEMENTS TO WIRELESS NETWORKS TO SUPPORT SHORT MESSAGE SERVICE (SMS) COMMUNICATION IN THE PACKET SWITCHED DOMAIN

(71) Applicant: Intel Corporation, Santa Clara, CA (US)

(72) Inventors: Puneet K. Jain, Hillsboro, OR (US); Vivek Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 13/631,379

(22) Filed: Sep. 28, 2012

(65) Prior Publication Data

US 2013/0265938 A1    Oct. 10, 2013

Related U.S. Application Data

(60) Provisional application No. 61/621,939, filed on Apr. 9, 2012.

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0051* (2013.01); *H04L 27/2657* (2013.01);
(Continued)

(58) Field of Classification Search
CPC . H04L 5/0048; H04L 5/0051; H04L 27/2657; H04L 51/38; H04L 65/4092;
(Continued)

(56) References Cited

U.S. PATENT DOCUMENTS 6,567,667 B1    5/2003 Gupta et al.
6,678,524 B1    1/2004 Hansson et al.
(Continued)

FOREIGN PATENT DOCUMENTS

CN    102172054 A    8/2011
CN    102256219 A    11/2011
(Continued)

OTHER PUBLICATIONS

3GPP TS 24.008 v11.2.0, Mar. 2012 , pp. 1-30, 355-367, and 537.*
(Continued)

*Primary Examiner* — Habte Mered
(74) *Attorney, Agent, or Firm* — Thorpe North & Western; Alex Haymond

(57) ABSTRACT

Technology for communicating a short message service (SMS) communication in a packet switched (PS) domain of a serving general packet radio service (GPRS) support node SGSN in a Universal Terrestrial Radio Access Network (UTRAN). One method comprises receiving, at the SGSN, a request message from a user equipment (UE) indicating that the UE supports PS based SMS and performs a circuit switched (CS) registration only to receive SMS service via a CS domain; and sending, from the CN control node, an accept message to the UE indicating that SMS over a non-access stratum (NAS) is supported by the SGSN.

20 Claims, 10 Drawing Sheets

(51) Int. Cl.

| | | |
|---|---|---|
| *H04N 21/442* | (2011.01) | |
| *H04N 21/643* | (2011.01) | |
| *H04W 4/14* | (2009.01) | |
| *H04W 60/04* | (2009.01) | |
| *H04L 12/58* | (2006.01) | |
| *H04L 29/06* | (2006.01) | |
| *H04W 8/06* | (2009.01) | |
| *H04W 48/18* | (2009.01) | |
| *H04W 76/02* | (2009.01) | |
| *H04W 4/00* | (2009.01) | |

(52) U.S. Cl.
CPC .......... *H04L 51/38* (2013.01); *H04L 65/4092* (2013.01); *H04N 21/44209* (2013.01); *H04N 21/643* (2013.01); *H04W 4/001* (2013.01); *H04W 4/14* (2013.01); *H04W 8/06* (2013.01); *H04W 48/18* (2013.01); *H04W 60/04* (2013.01); *H04W 76/026* (2013.01)

(58) Field of Classification Search
CPC .......... H04N 21/643; H04N 21/44209; H04W 4/001; H04W 4/12; H04W 4/14; H04W 88/184; H04W 60/04; H04W 8/06; H04W 48/18; H04W 76/026; H04M 1/72552
See application file for complete search history.

(56) References Cited

U.S. PATENT DOCUMENTS

| | | | |
|---|---|---|---|
| 2002/0077133 | A1 | 6/2002 | Mizell et al. |
| 2006/0114882 | A1 | 6/2006 | Mills |
| 2008/0080428 | A1 | 4/2008 | Jappila et al. |
| 2008/0233947 | A1 | 9/2008 | Herrero-Veron |
| 2009/0135813 | A1 | 5/2009 | Aaltonen |
| 2009/0270099 | A1 | 10/2009 | Gallagher et al. |
| 2010/0087215 | A1 | 4/2010 | Gu et al. |
| 2010/0097990 | A1 | 4/2010 | Hallenstal et al. |
| 2010/0260105 | A1 | 10/2010 | Keller et al. |
| 2010/0261490 | A1* | 10/2010 | Berry ............ H04W 4/12 455/466 |
| 2010/0323695 | A1 | 12/2010 | Kallio et al. |
| 2011/0021216 | A1 | 1/2011 | Pudney et al. |
| 2011/0077005 | A1 | 3/2011 | Bhatt et al. |
| 2011/0103277 | A1* | 5/2011 | Watfa et al. .......... 370/310 |
| 2011/0110302 | A1 | 5/2011 | Faurie et al. |
| 2011/0191430 | A1 | 8/2011 | Griot et al. |
| 2011/0194505 | A1* | 8/2011 | Faccin et al. .......... 370/329 |
| 2011/0280217 | A1 | 11/2011 | Drevon et al. |
| 2011/0286343 | A1 | 11/2011 | Powell et al. |
| 2012/0071163 | A1 | 3/2012 | Klingenbrunn et al. |
| 2012/0135761 | A1 | 5/2012 | Nenner et al. |
| 2013/0100895 | A1 | 4/2013 | Aghili et al. |
| 2013/0115982 | A1 | 5/2013 | Stojanovski et al. |
| 2013/0143610 | A1* | 6/2013 | Jeong ............ H04W 4/14 455/466 |
| 2013/0150031 | A1* | 6/2013 | Hedman .......... H04W 4/14 455/433 |
| 2013/0155954 | A1 | 6/2013 | Wang et al. |
| 2013/0244649 | A1 | 9/2013 | Liao et al. |

FOREIGN PATENT DOCUMENTS

| | | |
|---|---|---|
| EP | 2158780 B1 | 9/2011 |
| WO | 2008041085 A2 | 4/2008 |
| WO | WO 2008/041085 A2 | 4/2008 |
| WO | WO 2008/113775 A2 | 9/2008 |
| WO | 2009071702 A1 | 6/2009 |
| WO | WO 2009/071702 A1 | 6/2009 |
| WO | WO 2011/020002 A1 | 2/2011 |
| WO | WO 2011/079739 A1 | 7/2011 |
| WO | WO 2013/083803 A2 | 6/2013 |
| WO | 2013154965 A1 | 10/2013 |
| WO | WO 2013/154965 | 10/2013 |

OTHER PUBLICATIONS

International Search Report and Written Opinion received for International Application No. PCT/US2013/035570, mailed Jul. 29, 2013, 9 pages.
Office Action and Search Report received for Netherlands Patent Application No. 2010600, mailed on Aug. 6, 2014, 6 Pages of Search Report and 5 Pages of English Translation.
Ericsson et al., "PS only SMS over EPS", 3GPP TDocs, S2-120662, SA WG2 Meeting #89, Feb. 6-10, 2012, 3 Pages.
Huawei et al., "Support of PS-only service provision", S2-121109, SA WG2 Meeting #89, Feb. 6-10, 2012, 29 Pages.
Nokia Siemens Networks, "PS only", TD S2-120798, 3GPP TSG SA WG2 Meeting #89, Feb. 6-10, 2012, 3 Pages.
International Preliminary Report on Patentability and Written Opinion received for PCT Patent Application No. PCT/US2013/035570, mailed on Oct. 23, 2014, 6 Pages.
3GPP TS 23.060 v11.1.0; $3^{rd}$ Generation Partnership Project; Technical Specification Group Services and System Aspects; General Packet Radio Service (GPRS); Service description; Stage 2; Mar. 2012; 332 pages; Release 11; 3GPP Organizational Partners.
3GPP 23.272 CR 0746 S2-120663, "SMS Over SGs Usage to Support NAS Procedures for PS Only SMS", Jan. 2012.
3GPP SA WG2 S2-121108, "SMS Over SGs Usage to Support NAS Procedures for PS Only SMS", Ericsson et al, Feb. 2011, pp. 17, Release 11, Meeting 89, Version 10.6.0, Vancouver, Canada.
3GPP TS 23.060 V11.1.0; $3^{rd}$ Generation Partnership Project; Technical Specification Group Services and System Aspects; General Packet Radio Service (GPRS); Service description; Stage 2; Mar. 2012; 326 pages; Release 11; 3GPP Organizational Partners.
3GPP TS 24.008 V11.2.1, "Mobile Radio Interface Layer 3 Specification; Core Network Protocols; Stage 3", Technical Specification Group Core Network and Terminals, Mar. 2012, Release 11, pp. 3.
3GPP TS 24.301 V11.2.1, "Non-Access-Stratum (NAS) Protocol for Evolved Packet System (EPS); Stage 3", Technical Specification Group Core Network and Terminals, Mar. 2012, Release 11, pp. 327.
3GPP TSG SA WG2 S2-114349, "PS Domain Only: Inhibiting CS Domain Except for SMS Over SGs", Oct. 2011, pp. 5, Meeting 87, Korea.
3GPP TSG SA WG2 S2-115461, "Discussions and Conclusions About PS-Only", Nov. 2011, pp. 2, Meeting 88, San Francisco, CA.
3GPP TSG SA WG2 TD S2-120708, "PS-Only High Level Function Description", Discussion and Agreement, Huawei, Feb. 2012, pp. 1, Meeting 89, Release 11, Agenda 9.7.3, Canada.
3GPP TSG-SA WG2 S2-120586, "PS-Only Normative Change", SA2, SIMTC, Samsung, Feb. 2012, pp. 7, Meeting 89, Release 11, Version 10.6.0, Canada.
Ericsson et al, "PS Only SMS Over EPS", 3GPP TDocs, S2-120662 SA WG2 Meeting #89, Feb. 2012, pp. 3.
Gessner et al, "Voice and SMS in LTE", Rohde & Schwarz, May 2011, pp. 45.
Huawei et al, "Support of PS-Only Service Provision", S2-121109, SA WG2 Meeting #89, Feb. 2012, pp. 30.
Nokia Siemens Networks, "PS Only", TD S2-120798, 3GPP TSG SA WG2 Meeting #89, Feb. 2012, pp. 3.
Nokia Siemens Networks, "SMS Service Via PS Domain", C1-121212, 3GPP TSG-CT WG1 Meeting #77, Apr. 2012, pp. 19.
Office Action and search report for Finnish application 20135345 dated Jan. 27, 2015, 5 pages.
Office Action and Search Report for Netherlands patent application 2010600 mailed Aug. 6, 2014, 11 pages including English translation.
Office Action and search report for Twain application 102112496 dated Feb. 24, 2015, 5 pages English translation only.
Office action for Swedish application 1300255-5 dated Mar. 25, 2015, 7 pages English translation only.
Office Action for U.S. Appl. No. 13/631,044 dated Jan. 7, 2015, 62 pages.
Office Action for U.S. Appl. No. 13/631,044 dated Jul. 29, 2015, 63 pages.

(56) References Cited

OTHER PUBLICATIONS

Office Action for U.S. Appl. No. 13/631,044 dated Jul. 7, 2015, 62 pages.
Office Action for U.S. Appl. No. 13/631,379 dated Aug. 29, 2014 16 pages.
Office Action for U.S. Appl. No. 13/631,379 dated Jul. 30, 2015, 23 pages.
Office Action for U.S. Appl. No. 13/631,379 dated Mar. 25, 2015, 29 pages.
Office Action for U.S. Appl. No. 14/259,423 dated Aug. 5, 2015, 22 pages.
Office Action for U.S. Appl. No. 14/259,423 dated Aug. 29, 2014, 11 pages.
PC T search report and written opinion for PCT application PTCT/US2013/035570 mailed Oct. 23, 2014, 6 pages.
PC T search report and written opinion for PCT application PTCT/US2013/035570 mailed Jul. 29, 2013, 9 pages.
PC T search report and written opinion for PCT application PTCT/US2013/035572 mailed Jul. 26, 2013, 14 pages.
Search report for Belgium application 2013/0256 dated Mar. 5, 2015, 13 pages.
Search report for Spanish application 201330503 dated Dec. 23, 2014, 6 pages English translation only.
Alcatel-Lucent et al, "EPS Enhancements to Support PS-Only SMS", SA WG S2-120583, Feb. 2012, pp. 17, Meeting 89, V 11.0.0, CR 2315, Vancouver, Canada.
Catt, "PS only support Granularity and UE operation Mode in 2G/3G," 3GPP TSG SA WG2 Meeting #89, S2-120771 (Jan. 31, 2012).

\* cited by examiner

| IEI | Information Element | Type/Reference | Presence | Format | Length |
|---|---|---|---|---|---|
| | Protocol discriminator | Protocol discriminator 10.2 | M | V | 1/2 |
| | Skip indicator | Skip indicator 10.3.1 | M | V | 1/2 |
| | Attach request message identity | Message type 10.4 | M | V | 1 |
| | MS network capability | MS network capability 10.5.5.12 | M | LV | 3-9 |
| | Attach type | Attach type 10.5.5.2 | M | V | 1/2 |
| | GPRS ciphering key sequence number | Ciphering key sequence number 10.5.1.2 | M | V | 1/2 |
| | DRX parameter | DRX parameter 10.5.5.6 | M | V | 2 |
| | Mobile identity | Mobile identity 10.5.1.4 | M | LV | 6-9 |
| | Old routing area identification | Routing area identification 10.5.5.15 | M | V | 6 |
| | MS Radio Access capability | MS Radio Access capability 10.5.5.12a | M | LV | 6-51 |
| 19 | Old P-TMSI signature | P-TMSI signature 10.5.5.8 | O | TV | 4 |
| 17 | Requested READY timer value | GPRS Timer 10.5.7.3 | O | TV | 2 |
| 9- | TMSI status | TMSI status 10.5.5.4 | O | TV | 1 |
| 33 | PS LCS Capability | PS LCS Capability 10.5.5.22 | O | TLV | 3 |
| 11 | Mobile station classmark 2 | Mobile station classmark 2 10.5.1.6 | O | TLV | 5 |
| 20 | Mobile station classmark 3 | Mobile station classmark 3 10.5.1.7 | O | TLV | 2-34 |
| 40 | Supported Codecs | Supported Codec List 10.5.4.32 | O | TLV | 5-n |
| 58 | UE network capability | UE network capability 10.5.5.26 | O | TLV | 4-15 |
| 1A | Additional mobile identity | Mobile identity 10.5.1.4 | O | TLV | 7 |
| 1B | Additional old routing area identification | Routing area identification 2 10.5.5.15a | O | TLV | 8 |
| 5D | Voice domain preference and UE's usage setting | Voice domain preference and UE's usage setting 10.5.5.28 | O | TLV | 3 |
| D- | Device properties | Device properties 10.5.7.8 | O | TV | 1 |
| E- | P-TMSI type | P-TMSI type 10.5.5.29 | O | TV | 1 |
| C- | MS network feature support | MS network feature support 10.5.1.15 | O | TV | 1 |
| 14 | Old location area identification | Location Area Identification 2 10.5.5.30 | O | TLV | 7 |
| TBD | Additional Update Type | Additional Update Type | O | TV | 1 |

FIG. 3

| IEI | Information Element | Type/Reference | Presence | Format | Length |
|---|---|---|---|---|---|
| | Protocol discriminator | Protocol discriminator 10.2 | M | V | 1/2 |
| | Skip indicator | Skip indicator 10.3.1 | M | V | 1/2 |
| | Routing area update request message identity | Message type 10.4 | M | V | 1 |
| | Update type | Update type 10.5.5.18 | M | V | 1/2 |
| | GPRS ciphering key sequence number | Ciphering key sequence number 10.5.1.2 | M | V | 1/2 |
| | Old routing area identification | Routing area identification 10.5.5.15 | M | V | 6 |
| | MS Radio Access capability | MS Radio Access capability 10.5.5.12a | M | LV | 6 - 51 |
| 19 | Old P-TMSI signature | P-TMSI signature 10.5.5.8 | O | TV | 4 |
| 17 | Requested READY timer value | GPRS Timer 10.5.7.3 | O | TV | 2 |
| 27 | DRX parameter | DRX parameter 10.5.5.6 | O | TV | 3 |
| 9- | TMSI status | TMSI status 10.5.5.4 | O | TV | 1 |
| 18 | P-TMSI | Mobile identity 10.5.1.4 | O | TLV | 7 |
| 31 | MS network capability | MS network capability 10.5.5.12 | O | TLV | 4-10 |
| 32 | PDP context status | PDP context status 10.5.7.1 | O | TLV | 4 |
| 33 | PS LCS Capability | PS LCS Capability 10.5.5.22 | O | TLV | 3 |
| 35 | MBMS context status | MBMS context status 10.5.7.6 | O | TLV | 2-18 |
| 58 | UE network capability | UE network capability 10.5.5.26 | O | TLV | 4-15 |
| 1A | Additional mobile identity | Mobile identity 10.5.1.4 | O | TLV | 7 |
| 1B | Additional old routing area identification | Routing area identification 2 10.5.5.15a | O | TLV | 8 |
| 11 | Mobile station classmark 2 | Mobile station classmark 2 10.5.1.6 | O | TLV | 5 |
| 20 | Mobile station classmark 3 | Mobile station classmark 3 10.5.1.7 | O | TLV | 2-34 |
| 40 | Supported Codecs | Supported Codec List 10.5.4.32 | O | TLV | 5-n |
| 5D | Voice domain preference and UE's usage setting | Voice domain preference and UE's usage setting 10.5.5.28 | O | TLV | 3 |
| E- | P-TMSI type | P-TMSI type 10.5.5.29 | O | TV | 1 |
| D- | Device properties | Device properties 10.5.7.8 | O | TV | 1 |
| C- | MS network feature support | MS network feature support 10.5.1.15 | O | TV | 1 |
| 14 | Old location area identification | Location Area Identification 2 10.5.5.30 | O | TLV | 7 |
| TBD | Additional Update Type | Additional Update Type | O | TV | 1 |

FIG. 4

| IEI | Information Element | Type/Reference | Presence | Format | Length |
|---|---|---|---|---|---|
| | Protocol discriminator | Protocol discriminator 10.2 | M | V | 1/2 |
| | Skip indicator | Skip indicator 10.3.1 | M | V | 1/2 |
| | Attach accept message identity | Message type 10.4 | M | V | 1 |
| | Attach result | Attach result 10.5.5.1 | M | V | 1/2 |
| | Force to standby | Force to standby 10.5.5.7 | M | V | 1/2 |
| | Periodic RA update timer | GPRS Timer 10.5.7.3 | M | V | 1 |
| | Radio priority for SMS | Radio priority 10.5.7.2 | M | V | 1/2 |
| | Radio priority for TOM8 | Radio priority 2 10.5.7.5 | M | V | 1/2 |
| | Routing area identification | Routing area identification 10.5.5.15 | M | V | 6 |
| 19 | P-TMSI signature | P-TMSI signature 10.5.5.8 | O | TV | 4 |
| 17 | Negotiated READY timer value | GPRS Timer 10.5.7.3 | O | TV | 2 |
| 18 | Allocated P-TMSI | Mobile identity 10.5.1.4 | O | TLV | 7 |
| 23 | MS identity | Mobile identity 10.5.1.4 | O | TLV | 7-10 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| B- | Network feature support | Network feature support 10.5.5.23 | O | TV | 1 |
| 34 | Emergency Number List | Emergency Number List 10.5.3.13 | O | TLV | 5-50 |
| A- | Requested MS Information | Requested MS Information 10.5.5.25 | O | TV | 1 |
| 37 | T3319 value | GPRS Timer 2 10.5.7.4 | O | TLV | 3 |
| 38 | T3323 value | GPRS Timer 2 10.5.7.4 | O | TLV | 3 |
| 39 | T3312 extended value | GPRS Timer 3 10.5.7.4a | O | TLV | 3 |
| TBD | Extended Network feature support | Extended Network feature support | O | TV | 1 |

FIG. 5

| IEI | Information Element | Type/Reference | Presence | Format | Length |
|---|---|---|---|---|---|
|  | Protocol discriminator | Protocol discriminator 10.2 | M | V | 1/2 |
|  | Skip indicator | Skip indicator 10.3.1 | M | V | 1/2 |
|  | Routing area update accept message identity | Message type 10.4 | M | V | 1 |
|  | Force to standby | Force to standby 10.5.5.7 | M | V | 1/2 |
|  | Update result | Update result 10.5.5.17 | M | V | 1/2 |
|  | Periodic RA update timer | GPRS Timer 10.5.7.3 | M | V | 1 |
|  | Routing area identification | Routing area identification 10.5.5.15 | M | V | 6 |
| 19 | P-TMSI signature | P-TMSI signature 10.5.5.8 | O | TV | 4 |
| 18 | Allocated P-TMSI | Mobile identity 10.5.1.4 | O | TLV | 7 |
| 23 | MS identity | Mobile identity 10.5.1.4 | O | TLV | 7-10 |
| 26 | List of Receive N-PDU Numbers | Receive N-PDU Number list 10.5.5.11 | O | TLV | 4 - 19 |
| 17 | Negotiated READY timer value | GPRS Timer 10.5.7.3 | O | TV | 2 |
| 25 | GMM cause | GMM cause 10.5.5.14 | O | TV | 2 |
| 2A | T3302 value | GPRS Timer 2 10.5.7.4 | O | TLV | 3 |
| 8C | Cell Notification | Cell Notification 10.5.5.21 | O | T | 1 |
| 4A | Equivalent PLMNs | PLMN List 10.5.1.13 | O | TLV | 5-47 |
| 32 | PDP context status | PDP context status 10.5.7.1 | O | TLV | 4 |
| B- | Network feature support | Network feature support 10.5.5.23 | O | TV | 1 |
| 34 | Emergency Number List | Emergency Number List 10.5.3.13 | O | TLV | 5-50 |
| 35 | MBMS context status | MBMS context status 10.5.7.6 | O | TLV | 2 - 18 |
| A- | Requested MS Information | Requested MS Information 10.5.5.25 | O | TV | 1 |
| 37 | T3319 value | GPRS Timer 2 10.5.7.4 | O | TLV | 3 |
| 38 | T3323 value | GPRS Timer 2 10.5.7.4 | O | TLV | 3 |
| 39 | T3312 extended value | GPRS timer 3 10.5.7.4a | O | TLV | 3 |
| TBD | Extended Network feature support | Extended Network feature support | O | TV | 1 |

FIG. 6

| Cause value (octet 2) Bits | | | | | | | |
|---|---|---|---|---|---|---|---|
| 8 | 7 | 6 | 5 | 4 | 3 | 2 | 1 |
| 0 | 0 | 0 | 0 | 0 | 0 | 1 | 0 | IMSI unknown in HLR
| 0 | 0 | 0 | 0 | 0 | 0 | 1 | 1 | Illegal MS
| 0 | 0 | 0 | 0 | 0 | 1 | 0 | 1 | IMEI not accepted
| 0 | 0 | 0 | 0 | 0 | 1 | 1 | 0 | Illegal ME
| 0 | 0 | 0 | 0 | 0 | 1 | 1 | 1 | GPRS services not allowed
| 0 | 0 | 0 | 0 | 1 | 0 | 0 | 0 | GPRS services and non-GPRS services not allowed
| 0 | 0 | 0 | 0 | 1 | 0 | 0 | 1 | MS identity cannot be derived by the network
| 0 | 0 | 0 | 0 | 1 | 0 | 1 | 0 | Implicitly detached
| 0 | 0 | 0 | 0 | 1 | 0 | 1 | 1 | PLMN not allowed
| 0 | 0 | 0 | 0 | 1 | 1 | 0 | 0 | Location Area not allowed
| 0 | 0 | 0 | 0 | 1 | 1 | 0 | 1 | Roaming not allowed in this location area
| 0 | 0 | 0 | 0 | 1 | 1 | 1 | 0 | GPRS services not allowed in this PLMN
| 0 | 0 | 0 | 0 | 1 | 1 | 1 | 1 | No Suitable Cells In Location Area
| 0 | 0 | 0 | 1 | 0 | 0 | 0 | 0 | MSC temporarily not reachable
| 0 | 0 | 0 | 1 | 0 | 0 | 0 | 1 | Network failure
| 0 | 0 | 0 | 1 | 0 | 1 | 0 | 0 | MAC failure
| 0 | 0 | 0 | 1 | 0 | 1 | 0 | 1 | Synch failure
| 0 | 0 | 0 | 1 | 0 | 1 | 1 | 0 | Congestion
| 0 | 0 | 0 | 1 | 0 | 1 | 1 | 1 | GSM authentication unacceptable
| 0 | 0 | 0 | 1 | 1 | 0 | 0 | 1 | Not authorized for this CSG
| 0 | 0 | 1 | 0 | 1 | 0 | 0 | 0 | No PDP context activated
| 0 | 0 | 1 | 1 | 0 | 0 | 0 | 0 | }
| | | | to | | | | | } retry upon entry into a new cell
| 0 | 0 | 1 | 1 | 1 | 1 | 1 | 1 | }
| 0 | 1 | 0 | 1 | 1 | 1 | 1 | 1 | Semantically incorrect message
| 0 | 1 | 1 | 0 | 0 | 0 | 0 | 0 | Invalid mandatory information
| 0 | 1 | 1 | 0 | 0 | 0 | 0 | 1 | Message type non-existent or not implemented
| 0 | 1 | 1 | 0 | 0 | 0 | 1 | 0 | Message type not compatible with the protocol state
| 0 | 1 | 1 | 0 | 0 | 0 | 1 | 1 | Information element non-existent or not implemented
| 0 | 1 | 1 | 0 | 0 | 1 | 0 | 0 | Conditional IE error
| 0 | 1 | 1 | 0 | 0 | 1 | 0 | 1 | Message not compatible with the protocol state
| 0 | 1 | 1 | 0 | 1 | 1 | 1 | 1 | Protocol error, unspecified
| 0 | 1 | 1 | 1 | 0 | 0 | 0 | 0 | IMSI attach rejected as PS-only-Enabled
| 0 | 1 | 1 | 1 | 0 | 0 | 0 | 1 | IMSI attach rejected as PS-only-Enforced and network supports SMS over Gs(NAS)

Any other value received by the mobile station shall be treated as 0110 1111, "Protocol error, unspecified". Any other value received by the network shall be treated as 0110 1111, "Protocol error, unspecified".

FIG. 7

ENHANCEMENTS TO WIRELESS NETWORKS TO SUPPORT SHORT MESSAGE SERVICE (SMS) COMMUNICATION IN THE PACKET SWITCHED DOMAIN

RELATED APPLICATIONS

This application claims the benefit of and hereby incorporates by reference U.S. Provisional Patent Application Ser. No. 61/621,939, filed Apr. 9, 2012.

BACKGROUND

As the use of mobile wireless devices, such as smart phones and tablet devices, becomes more ubiquitous, the demands on the limited amount of radio frequency spectrum used by those devices also increases, resulting in wireless network congestion in the licensed spectrum. In addition, the increased use of high bandwidth applications such as audio and video streaming can increase demands beyond the capability of the available spectrum. This is especially true in high density and high use locations such as large cities and universities. One projection estimates a growth of 20 times in mobile internet traffic from 2010 to 2015.

Improvements in wireless architectures, hardware design, and processor speed have significantly increased the efficiency of wireless devices in their use of the available spectrum. However, certain legacy aspects from previous generations of wireless network specifications continue to reduce the potential efficiency of modern wireless architectures.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3 illustrates an example of an Attach Request message illustrated in a table format with an Additional Update Type Information Element (IE) in accordance with an example;

FIG. 4 illustrates an example of an Routing Area Update (RAU) Request message illustrated in a table format with an Additional Update Type Information Element (IE) in accordance with an example;

FIG. 5 illustrates an example of an Attach Accept message illustrated in a table format with an Extended Network Feature Support Information Element (IE) in accordance with an example;

FIG. 6 illustrates an example of an Routing Area Update Accept message illustrated in a table format with an Extended Network Feature Support Information Element (IE) in accordance with an example;

FIG. 7 illustrates an example of a General Packet Radio Service (GPRS) mobility management (GMM) Cause Information Element with a new cause code in accordance with an example;

Figure 1:
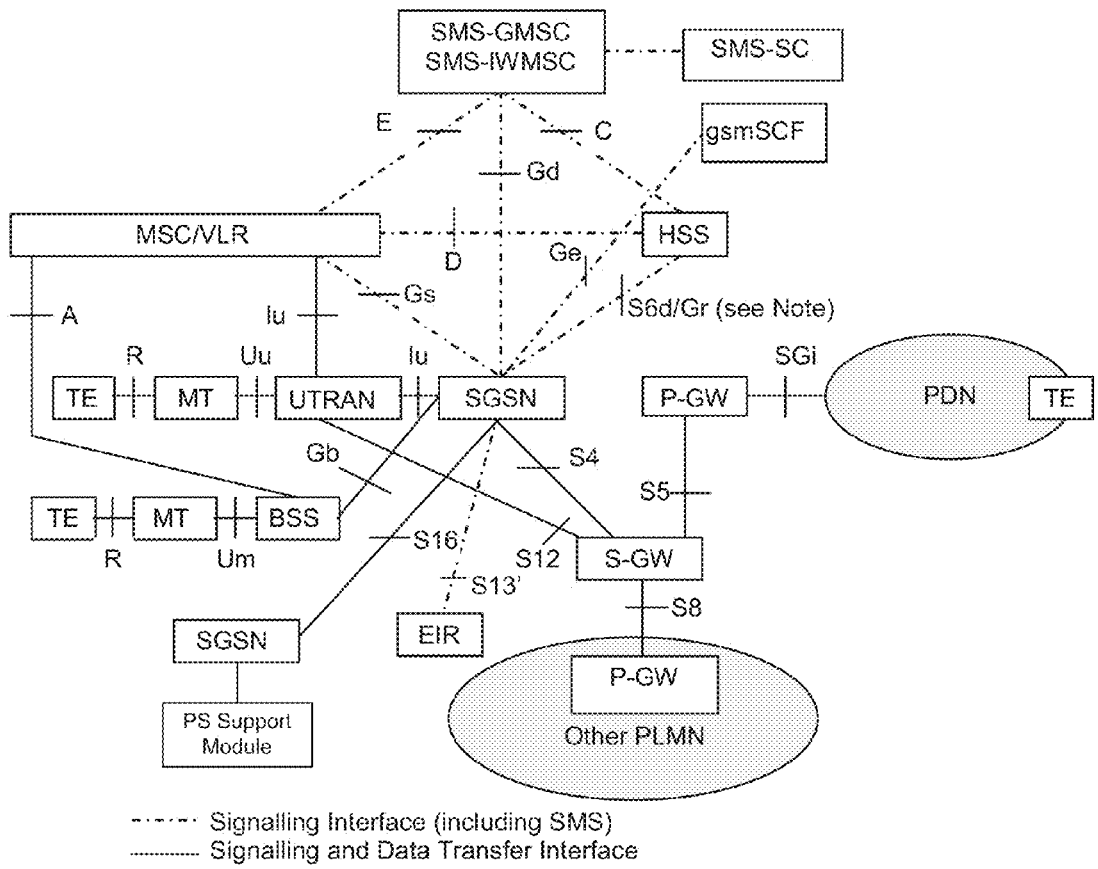
FIG. 1 illustrates an example of a General Packet Radio Service (GPRS) Logical Architecture when based on the S4, S5, and S8 interfaces.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "Core Network (CN) control node" is a generic term that refers to either a Mobility Management Entity (MME) or a Serving GPRS (General Packet Radio Service) Support Node (SGSN).

As used herein, the term User Equipment (UE) refers to a wireless device configured to communicate with a Third Generation Partnership Project (3GPP) wireless network.

As used herein, the term mobile station (MS) refers to a wireless device configured to communicate with a Third Generation Partnership Project (3GPP) wireless network. The terms UE and MS are considered to be synonymous and may be used interchangeably throughout this document, unless otherwise noted.

Additional definitions may be provided in the proceeding paragraphs in the example embodiments.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An exponential increase in the amount of wireless data transmission has created congestion in wireless networks using licensed spectrum to provide wireless communication services for wireless devices such as smart phones and tablet devices, to name a few. The congestion is especially apparent in high density and high use locations such as urban locations and universities.

One technique for providing additional bandwidth capacity to wireless devices is through the transformation of wireless networks from circuit switching to packet switching. In circuit switching, wireless communication involves using a limited number of dedicated connections that typically have a constant bit rate and a constant delay between the wireless nodes. These dedicated connections may be open even if no data is being transmitted by a wireless device. This can lead to inefficiencies in the use of radio frequency spectrum.

In contrast with circuit switching, packet switching involves grouping data that is to be transmitted, regardless of the data's content, type, or structure, into blocks referred to as packets. Packet switching provides the ability to deliver variable bit rate data streams over a shared network. Packets can be buffered or queued at network adapters, switches, routers, or other network nodes, thereby enabling packets to be delivered with variable delay and throughput depending on the traffic load in the network. The use of packet switching improves the ability of a wireless network to provide a desired Quality of Service (QoS) in a wireless network. In addition, the use of packet switching can significantly improve the efficiency in which data is transmitted, resulting in lower costs for consumers and more efficient use of the crowded radio frequency spectrum.

As wireless communication standards have continued to develop, the use of packet switching has become more and more prevalent. However, certain legacies from earlier standards still remain in even the most modern wireless communication standards. One such legacy is the use of circuit switching to communicate Short Message Service (SMS) communications between wireless devices configured to operate with the Third Generation Partnership Project (3GPP) Long Term Evolution (LTE) specification.

Short Message Service communications, which are typically referred to as "text messaging" is a communications protocol that enables the interchange of a text message of up to 160 characters in length between mobile devices. Messages are sent to a Short Message Service Centre (SMSC) where they can be stored until the destination wireless device is active. Once the destination wireless device is connected to a wireless network, the SMS message can be communicated from the SMSC to the wireless device.

Releases 8, 9, 10 and 11(Stage 2 freeze in September, 2012) of the 3GPP LTE specification still use circuit switching (CS) to provide SMS communications. The communication of SMS is one of the last vestiges of CS in the 3GPP network. In order to provide SMS communication using CS, a user equipment (UE) typically has to connect with a Mobile Switching Center (MSC). The MSC provides an interface between the radio system and the fixed networks. The MSC can perform desired functions in order to provide CS services to and from the UE. Thus, user equipment (UEs) often connect with an MSC. This connection can result in excessive overhead, as well as the use of unnecessary dedicated wireless connections.

To overcome this limitation, the advent of SMS communication using packet switching (PS) in the 3GPP network can be implemented. The implementation of PS based SMS can be accomplished in different ways depending on the age and/or architecture of the wireless network.

Modern 3GPP LTE based networks can implement PS based SMS communication using the network's Mobility Management Entity (MME). The MME is the control node that processes the signaling between the UE and the Core Network (CN). The MME can provide Visitor Location Register (VLR) functionality for an Evolved Packet System (EPS). This will be discussed more fully in the proceeding paragraphs.

Older wireless networks can include an assortment of old and new wireless networking equipment. The wireless networking equipment is often generally referred to based on the "generation" to which the equipment belongs, according to the equipment's age and capabilities. For example, wireless networking equipment may be designated based on the "generation" to which the equipment belongs, such as 2G, 2.5G, 3G, or 4G. Networks that include an assortment of different generations can include a Serving GPRS (General Packet Radio Service) Support Node (SGSN).

GPRS is a mobile data service extension to the Global System for Mobile communications (GSM). GSM is a 2G system. GPRS is often described as a 2.5G system. The SGSN acts as the control node, similar to the MME in 4G systems. The SGSN is the interface between the radio system and the fixed network for Packet Switched (PS) services. The SGSN can perform the functions to handle packet transmission to and from the UE. The SGSN can be used to provide PS based SMS, thereby eliminating the need for a UE to connect to an MSC merely for SMS communication in a 2.5G or 3G wireless network.

As UEs move through different networks, the capability of each network can vary. Some networks may support SMS services via a PS domain non access stratum (NAS) layer. However, other networks may not support this. Therefore, a subscription intended for PS-only service provision may allow also for SMS services via CS domain to provide a UE with SMS services in situations when the serving node or network do not support SMS via PS domain NAS signaling.

A discussion of the SMS in SGSN architecture for SMS services will be described below. Messaging used between the UE and the SGSN to implement the SMS in SGSN architecture will be provided. A discussion of the SMS in MME architecture will follow.

FIG. 1 provides an example of a GPRS Logical Architecture when based on S4/S5/S8 interfaces. The architecture is described in the 3GPP Technical Specification (TS) 23.060. One example is provided in 3GPP TS 23.060 V11.1.0 (2012-03).

A GPRS Support Node (GSN) contains functionality used to support GPRS functionality for the GSM/EDGE Radio Access Network (GERAN) and/or the Universal Terrestrial Radio Access Network (UTRAN). In one Public Land Mobile Network (PLMN), there may be more than one GSN.

The SGSN and Gateway GPRS Support Node (GGSN) functionalities may be combined in the same physical node, or they may reside in different physical nodes. The SGSN and the GGSN contain Internet Protocol (IP) or other (i.e. Asynchronous Transfer Mode (ATM)) routing functionality. The SGSN and GGSN may be interconnected with IP routers.

The Gateway GPRS Support Node (GGSN) is the node that is accessed by the packet data network (PDN) after evaluation of the Packet Data Protocol (PDP) address. The GGSN contains routing information for PS-attached users. The routing information is used to tunnel N protocol data units (PDUs) to the UE's current point of attachment, i.e. the Serving GPRS Support Node. The GGSN may request location information from the Home Location Register (HLR) via the optional Gc interface. The GGSN is the first point of PDN interconnection with a PLMN supporting GPRS (i.e. the Gi reference point is supported by the GGSN). GGSN functionality is common for all types of RANs.

The Serving GPRS Support Node (SGSN) is the node that is serving the UE (i.e. mobile station (MS)). The SGSN supports GPRS for A/Gb mode (i.e. the Gb interface is supported by the SGSN) and/or Iu-mode (i.e. the Iu interface is supported by the SGSN). At PS attach, the SGSN establishes a mobility management context containing information pertaining to e.g. mobility and security for the MS. At PDP Context Activation, the SGSN establishes a PDP context, to be used for routing purposes, with the GGSN that the subscriber will be using. In Iu mode, the SGSN and RNC may be interconnected with one or more IP routers.

In Gn/Gp mode and when the SGSN and the GGSN are in different PLMNs, they are interconnected via the Gp interface. The Gp interface provides the functionality of the Gn interface, plus security functionality required for inter-PLMN communication. The security functionality is based on mutual agreements between operators.

In Gn/Gp mode, the SGSN interworks signaling on the Gn/Gp interface with Iu/Gb interface signaling. In S4 mode, the SGSN interworks signaling on the S4 interface with Iu/Gb interface signaling. One SGSN may have some UEs using Gn/Gp mode and other UEs using S4 mode.

The SGSN may send location information to the MSC/VLR via the optional Gs interface. The SGSN may receive paging requests from the MSC/VLR via the Gs interface.

The SGs interface can connect databases in the VLR and the MME. The SGs is also used to convey some circuit switched related procedures via the MME. The basis for the interworking between a VLR and an MME is the existence of an SGs association between those entities per UE. The SGs association is applicable to UEs which are configured to use CS fallback and SMS over SGs, or SMS over SGs only. The SGs association is not applicable if the subscriber data indicates that the subscription is for packet switched (PS) communication only. The SGs association is also not applicable if the Home Subscriber Server (HSS) signals "SMS in MME Support" capability and the MME determines that SMS service is to be provided using the SMS in MME feature.

The SGSN interfaces with the GSM-SCF for optional Customized Application for Mobile Enhanced network Logic (CAMEL) control using the Ge reference point. Depending on the result from the CAMEL interaction, the session and packet data transfer may proceed normally. Otherwise, interaction with the GSM-SCF continues as described in TS 23.078.

The functionality of the Serving Gateway is defined in 3GPP TS 23.401 with the following additions and exceptions: The Serving Gateway can terminate the user plane interface towards the UTRAN when the Direct Tunnel feature is in use. The Serving Gateway is the local Mobility Anchor point for the Serving Radio Network Subsystem (SRNS) relocation when the Direct Tunnel feature is in use. The Serving Gateway can also be the local Mobility Anchor for an inter-SGSN routing area update.

SMS in SGSN Architecture

In accordance with one embodiment of the present invention, the SMS in SGSN can be performed as follows. An indication can be added where the SGSN indicates to the Home Subscriber Server (HSS) in the Attach/Routing Area Update (RAU) procedures that it offers SMS in SGSN using the Gd interface. Subscription data information can be added for "PS-and-SMS-only" subscriptions. The SGSN identity can be registered for terminating SMS services. When this occurs, the HLR, operating on the HSS, can cancel any registered MSC. These operations align the behavior of the HLR/HSS for SGSN and MME. The handshaking of SMS support between the HSS and the SGSN (in both directions) can be based on existing Teleservice List parameters in the Gr MAP and S6d Diameter protocols. The Inter-SGSN RAU procedure can be updated to provide the same support for "SMS in SGSN" as the combined GPRS Attach/RAU procedures. A clarification about the "SMS-Supported" indication to the MS can be added in the GPRS Attach Procedure.

The SGSN can indicate that it offers SMS services via the PS domain (i.e. Gd) to the HSS by an indication "SMS in SGSN offered" in the signaling with the HSS during the Attach/RAU procedure. When the subscription information indicates "PS and SMS only" the HSS can respond to queries from SMS-Gateway Mobile Switching Center (GMSC) and SMS routers so that Mobile Terminated (MT) SMS gets routed to serving nodes in the PS domain when SMS via the PS domain are offered by these serving nodes.

A CS/PS enabled UE that needs only PS domain services and SMS services over a Non Access Stratum (NAS) layer indicates this capability as "SMS-only" to the SGSN during combined Attach/RAU procedures, i.e. the included CS registration is only requested for obtaining SMS services over NAS. The term "SMS services over NAS" refers to the signaling that occurs through the NAS layer in the network to provide PS based SMS services. The term "SMS services over NAS" can also be referred to as SMS via GPRS.

Based on the UE provided information (i.e. the SMS-only indication to the SGSN) and when the HSS provided subscription information indicates "SMS in SGSN Support" and the SGSN supports SMS services over NAS, the SGSN can then determine to not establish an association with an MSC when requested by the UE in the combined Attach/RAU procedures.

The SGSN can forward the capability indicated by the UE as an "SMS-only" indication in the Location Update procedure to the HSS. If the HSS has an old serving MSC registered, the HSS can cancel the serving MSC for a UE that indicates "SMS-only" and subscribes to SMS services if both the SGSN and the HSS supports SMS in SGSN (i.e. the SGSN has indicated "SMS in SGSN offered" and the HSS supports SMS in SGSN). As only the SGSN is registered for MT SMS, the HSS can then respond to queries from SMS-GMSCs and SMS routers so that MT SMS is routed to serving node(s) in the PS domain.

In one embodiment, a UE can identify a type of PS-only service provisioning. A PS-only-enforced provisioning message sent from a UE to an SGSN indicates that the SGSN shall not perform any combined mobility management (MM) procedures for the UE and shall not establish a Gs association. In the PS-only-enforced, the network will not connect the UE to a CS domain. However, if the UE enters a network that does not support SMS services via a PS domain, then the UE won't receive any SMS messages while located within the network's coverage area.

Accordingly, an additional PS-only service is the PS-only-enabled service. A UE can send a PS-only-enabled message to the SGSN, which indicates to the SGSN that the UE's home Public Land Mobile Network (hPLMN) is able and willing to provide SMS services via the PS domain. If the UE indicates its capability during a combined attach/RAU procedure (i.e. the included CS registration is only requested for obtaining PS based SMS services), then the SGSN does not establish association with the MSC.

SMS in MME Architecture

Figure 2:
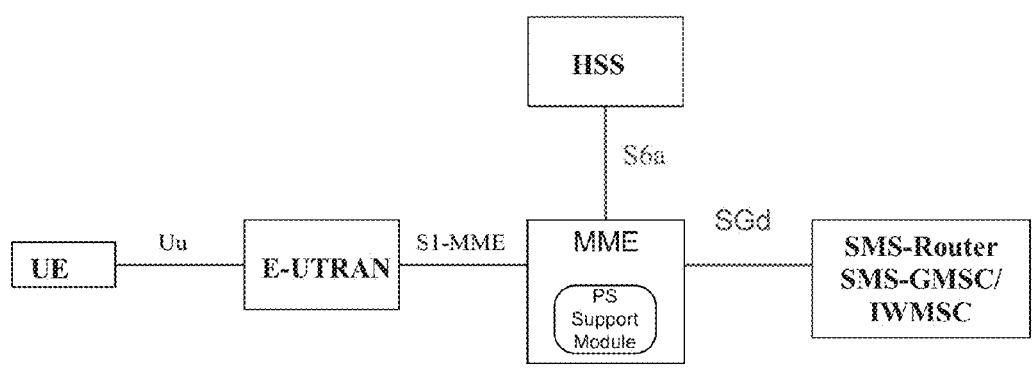
FIG. 2 illustrates an a Mobility Management Entity (MME) architecture configured to provide packet switched (PS) Short Message Service (SMS) communications in accordance with an example.

FIG. 2 provides an illustration of an MME architecture configured to provide PS based SMS services. The MME is in communication with the HSS via an S6a interface, which is a Diameter based interface that is enhanced with SMS support. A new direct "E" interface exists between the MME and SMS central functions, such as SMS router, SMS-Gateway Mobile Switching Center (GMSC) and SMS-Inter Working Mobile Switching Center (IWMSC). The E interface can be either a MAP or Diameter based protocol.

Mobile Application Part (MAP) is an SS7 protocol which provides an application layer for the various nodes in GSM and UMTS mobile core networks and GPRS core networks to communicate with each other in order to provide services to mobile phone users. The Mobile Application Part is the application-layer protocol used to access the Home Location Register, Visitor Location Register, Mobile Switching Center, Equipment Identity Register, Authentication Centre, Short message service center and Serving GPRS Support Node (SGSN).

The SGs interface can be used to relay SMS messages between the MME and VLR. The SMS-Switching Center (SC) may be integrated with the SMS-GMSC/SMS_IWMSC. The interface between the HSS and SMS central functions (SMS_IWMSC and SMS-GMSC, SMS-router) can be Diameter or a MAP C interface. There is an SGd interface between the MME and SMS central functions, as described in 3GPP TS 29.338.

The use of the SMS in MME architecture is for SMS services only. This functionality may not trigger any CS fallback and does not require an SGs. In addition, to provide SMS in MME, the MME can be configured to provide the following: SMS procedures between the UE and the MME can include support for the Short Message Control (SMC) and Short Message Relay (SMR) functions.

In one embodiment, the MME can be configured to support the combined EPS/IMSI procedures for "SMS-only" and in these: provide a non-broadcasted Location Area Identity (LAI) that is not associated with any Visitor Location Register (VLR). If needed, the MME can provide a reserved TMSI that is configured such that it cannot cause any ambiguities with other TMSIs. For instance, when the UE changes to an area where it needs to derive SMS services from a GERAN/UTRAN MSC. The MME can indicate in the Attach/RAU Accept message that the IMSI attach is for "SMS-only". The MME can notify the HSS that it is capable of SMS transfer without the need of establishing an SGs association with an MSC. The MME can obtain SMS related subscription information.

If the UE performs a combined GPRS attach/RAU procedure with "SMS-only" indication, the MME/SGSN can forward the "SMS-only" indication in the location update procedure to the HSS. The HSS can allow an operator to configure a subscription that is limited to only PS services and SMS services. This limitation is indicated in the PS subscription data as "PS and SMS only".

In order to setup a GERAN/UTRAN wireless communication system to provide PS based SMS, a UE can indicate its request for SMS services to the SGSN. The UE can communicate its PS-only capability to the SGSN. This can involve sending a message that the UE only requests CS registration to receive SMS services, but is capable of supporting PS based SMS. One way of communicating this message from the UE to the GPRS is by altering an Attach Request message. The Attach Request message is defined in section 9.4.1 of 3GPP TS 24.008. One example of a released version of the TS 24.008 is shown in 3GPP TS 24.008 V11.4.0 (2012-09).

The Attach Request message is sent by the UE to the network in order to perform an attach procedure with the network. An example of an Attach Request message for a GPRS attach is illustrated in FIG. 3 in a table format. The table includes information including the Information Element Identifier (IEI), the name of the Information Element (IE), the type of IE and a reference to the IE in the 3GPP TS 24.008, along with the presence, format, and length of each IE in the Attach Request message. It should be noted that the Attach Request message for GPRS is different than the Attach Request message for an EPS, which is defined in 3GPP TS 24.301.

In accordance with one embodiment, the UE can include additional information in one of the IEs communicated in the Attach Request message. Alternatively, an additional IE can be included in the Attach Request message. The additional IE may be included if the UE requests "SMS only" or if the UE supports PS based SMS and does CS registration only to receive SMS service via the CS domain. Several different types of IE can be used to communicate this message from the UE to the SGSN. Five different examples are provided herein. These examples are not intended to be limiting. Any means may be used to communicate this message from the UE to the SGSN. The examples below are labeled Solution A through Solution E.

Solution A

In this solution, a new IE Additional Update Type is added to the Attach Request message. The format of the Additional Update Type IE is provided in the proceeding paragraphs.

The purpose of the additional update type IE is to provide information regarding the UE's PS-only capability to the network. This informs the network of the UE's intent to request CS registration only for obtaining SMS service via the CS domain. In one embodiment, if the MS initiates a combined GPRS attach procedure for GPRS services and "SMS-only service", the MS can indicate "SMS only" in the Additional update type IE. The Additional Update Type IE is a type 1 information element. The Additional Update Type IE can be coded as shown in Table 1 and Table 2.

TABLE 1

Additional Update Type information element

| 8 | 7 | 6 | 5 | 4 | 3 | 2 | 1 | |
|---|---|---|---|---|---|---|---|---|
| Additional update type IEI | | | | 0 Spare | 0 Spare | 0 Spare | PSSS | octet 1 |

TABLE 2

Additional Update Type information element
PS based SMS Support (PSSS) (octet 1)

Bit 1

0     MS does not support PS based SMS
1     MS supports PS based SMS

Bit 1 set to 1 indicates MS support PS based SMS and CS registration is only to receive SMS service
Bits 4 to 2 of octet 1 are spare and shall be all coded as zero.

As shown in Table 2 above, Bit 1 in octet 1 can be a PS based SMS Support (PSSS) message. In this example, a Bit value of 0 provides the message that the MS does not support PS based SMS. A Bit value of 1 provides the message that the MS supports PS based SMS and does CS registration only to receive SMS service. The IE illustrated in Table 1 and 2 can be included in the Attach Request message shown in FIG. 3. In one embodiment, the MS can include this IE if the MS initiates a combined GPRS attach procedure for GPRS services and "SMS-only service". In another embodiment, the MS can include this IE if the MS supports PS based SMS. The IE can be used to indicate the PS-only capability of the MS to the network.

Solution B

In this solution one spare bit of the MS Network Feature Support IE of the Attach Request message is used to indicate a UE PS-only capability to the network; i.e. that the UE intent to request CS registration only for obtaining SMS services.

In accordance with one embodiment, the MS Network Feature Support IE, which is defined in section 9.9.3.20A of 3GPP TS 24.301 and section 10.5.1.15 of 3GPP TS 24.008, can be configured to include a PS based SMS Support message, as follows.

TABLE 3

MS Network Feature Support information element

| 8 7 6 5 | 4 | 3 | 2 | 1 | |
|---|---|---|---|---|---|
| Ms network feature support IEI | 0 Spare | 0 Spare | PSSS | extended periodic timers | octet 1 |

TABLE 4

MS Network Feature Support information element

Extended periodic timers (octet 1)

Bit 1

0  MS does not support the extended periodic timer in this domain
1  MS supports the extended periodic timer in this domain The relevant extended periodic timer is T3212 for Mobility Management (MM) messages, T3312 for GPRS MM (GMM) messages, and T3412 for EPS MM (EMM) messages.

PS based SMS Support (PSSS) (octet 1)

Bit 2

0  MS does not support PS based SMS
1  MS supports PS based SMS

Bit 2 set to 1 indicates MS support PS based SMS and CS registration is only to receive SMS service
Bits 4 and 3 of octet 1 are spare and shall be coded as zero.

As illustrated in Tables 3 and 4, Bit 2 in octet 1 can be a PS based SMS Support (PSSS) message in the MS network feature support IE. In this example, a Bit value of 0 provides the message that the MS does not support PS based SMS. A Bit value of 1 provides the message that the MS supports PS based SMS and does CS registration only to receive SMS service. The IE illustrated in Table 3, 4 can be included in the Attach Request message shown in FIG. 3.

Solution C

In this solution, one spare bit of the UE Network Capability IE of the ATTACH REQUEST message is used to indicate UE PS-only capability to the network; i.e. the UE's intent to request CS registration only for obtaining SMS based service.

In accordance with one embodiment, the UE Network Capability IE, which is defined in section 9.9.3.34 of 3GPP TS 24.301, can be configured to include a PS based SMS Support message. The mapping of the UE Network Capability IE is shown in Table 5. A portion of the UE Network capability IE information is shown in Table 6.

TABLE 5

UE Network Capability information element

| 8 | 7 | 6 | 5 | 4 | 3 | 2 | 1 | |
|---|---|---|---|---|---|---|---|---|
| UE network capability IEI | | | | | | | | octet 1 |
| Length of UE network capability contents | | | | | | | | octet 2 |
| EEA0 | 128-EEA1 | 128-EEA2 | 128-EEA3 | EEA4 | EEA5 | EEA6 | EEA7 | octet 3 |
| EIA0 | 128-EIA1 | 128-EIA2 | 128-EIA3 | EIA4 | EIA5 | EIA6 | EIA7 | octet 4 |
| UEA0 | UEA1 | UEA2 | UEA3 | UEA4 | UEA5 | UEA6 | UEA7 | octet 5* |
| USC2 | UIA1 | UIA2 | UIA3 | UIA4 | UIA5 | UIA6 | UIA7 | octet 6* |
| 0 spare | PSSS | H.245-ASH | ACC-CSFB | LPP | LCS | 1xSRVCC | NF | octet 7* |
| 0 | 0 | 0 | 0 | 0 | 0 | 0 | 0 | octet 8*-15* |
| Spare | | | | | | | | |

TABLE 6

UE Network Capability information element
PS based SMS Support (PSSS) (octet 7, bit 7)

0  MS does not support PS based SMS
1  MS supports PS Based SMS

Bit 7 set to 1 indicates MS support PS based SMS and CS registration is only to receive SMS service
All other bits in octet 8 to 15 are spare and shall be coded as zero, if the respective octet is included in the information element.

As illustrated in Tables 5 and 6, Bit 7 in octet 7 can be a PS based SMS Support (PSSS) message in the UE Network Capability IE. In this example, a Bit value of 0 provides the message that the MS does not support PS based SMS. A Bit value of 1 provides the message that the MS supports PS based SMS and does CS registration only to receive SMS. The IE illustrated in Table 5 and 6 can be included in the Attach Request message shown in FIG. 3.

Solution D

In this solution one spare bit of EPS Attach Type IE of ATTACH REQUEST is used to indicate UE PS-only capability to the network i.e. the UE's intent to request CS registration only for obtaining SMS based service.

In accordance with one embodiment, the EPS Attach Type IE, which is defined in section 9.9.3.11 of 3GPP TS 24.301 and in section 10.5.5.2 of TS 24.008, can be configured to include a PS based SMS Support message, as follows.

TABLE 7

EPS Attach Type information element

| 8 | 7 6 5 | 4 | 3 2 1 | |
|---|---|---|---|---|
| Attach type IEI | | FOR | Type of Attach | octet 1 |

TABLE 8

EPS Attach Type information element

Type of attach (octet 1, bit 1 to 3)

| Bits | | | |
|---|---|---|---|
| 3 | 2 | 1 | |
| 0 | 0 | 1 | GPRS attach |
| 0 | 1 | 0 | Not used. This value was allocated in earlier versions of the protocol (Note 1) |
| 0 | 1 | 1 | Combined GPRS/IMSI attach |
| 1 | 0 | 0 | Emergency attach |
| 1 | 0 | 1 | GPRS Attach + SMS-only |

GPRS Attach + SMS-only indicates MS support PS based SMS and CS registration is only to receive SMS service
All other values are interpreted as GPRS attach in this version of the protocol.

Follow-on request (octet 1, bit 4)

| Bits 4 | |
|---|---|
| 0 | No follow-on request pending |
| 1 | Follow-on request pending |

Follow-on request pending is applicable only in Iu mode.
(Note 1): The code point "010" if received by the network, it shall be interpreted as "Combined GPRS/IMSI attach".

As illustrated in Tables 7 and 8, a bit value of 101 in bits 1 to 3 of octet 1 provides the message that a GPRS attach+SMS-only, which indicates that the MS supports PS based SMS and CS registration is performed only to receive SMS service. The IE illustrated in Table 7 and 8 can be included in the Attach Request message shown in FIG. 3.

Solution E

In this solution, an existing IE MS Network Capability in the ATTACH REQUEST message can be extended to indicate a MS PS-only capability to the network; i.e. the MS's intent to request CS registration only for obtaining SMS based service.

In accordance with one embodiment, the MS Network Capability IE, which is defined in section 10.5.5.12 of 3GPP TS 24.008, can be configured to include a PS based SMS Support message, as follows

TABLE 9

MS Network Capability information element
. . .
PS based SMS Support (PSSS)

| 0 | MS does not support PS based SMS |
|---|---|
| 1 | MS supports PS based SMS |

As illustrated in Table 9, a selected bit in a selected octet of the IE can be a PS based SMS Support (PSSS) message. In this example, a Bit value of 0 provides the message that the MS does not support PS based SMS. A Bit value of 1 provides the message that the MS supports PS based SMS and does CS registration only to receive SMS service via the CS domain. The MS Network Capability IE is specified in section 10.5.5.12 of 3GPP TS 24.008. The IE illustrated in Table 9 can be included in the Attach Request message shown in FIG. 3.

While several examples have been provided to illustrate communication from the UE to the 3GPP network to communicate the UE's ability to perform PS based SMS support via the Attach Request message, this is not intended to be limiting. There are also additional ways in which this information could be communicated.

For example, enhancements, similar to those shown in Solutions A-E, can be made to the Routing Area Update (RAU) Request message described in 3GPP TS 24.008. One example of an RAU Request message is provided in FIG. 4. The enhancements to the RAU Request message can be used to communicate the MS's ability to perform PS based SMS support to the network. The message can be used to either request an update of the MS's location file or to request an IMSI attach for non-GPRS services.

Several different types of IE can be used to communicate information in the RAU Request message from the UE to the SGSN. Four different examples are provided herein. These examples are not intended to be limiting. Any means may be used to communicate this message from the UE to the SGSN. The examples below are labeled Solution A through Solution D.

RAU Request Support

Solution A

In this solution, a new Additional Update Type IE is added to the RAU Request message. The purpose of the Additional Update Type IE is to provide UE PS-only capability to the network, enabling the network to be aware of the UE's intent to request CS registration only for obtaining SMS service via the CS domain. In one embodiment, if the MS initiates the combined routing area updating procedure for GPRS services and "SMS-only service", the MS can indicate "SMS only" in the additional update type IE.

The format of the Additional Update Type IE is shown in Tables 1 and 2, as previously described. The same format can be used to communicate the IE in the RAU Request message.

Solution B

In this solution, an existing MS Network Capability IE in the RAU Request message is extended to indicate UE PS-only capability to the network. This enables the network to be aware of the UE's intent to request CS registration only for obtaining SMS service via the CS domain.

In accordance with one embodiment, the MS Network Capability IE, which is defined in section 10.5.5.12 of 3GPP TS 24.008, can be configured to include a PS based SMS Support message, as follows

TABLE 10

MS Network Capability information element
. . .
PS based SMS Support (PSSS)

| 0 | MS does not support PS based SMS |
|---|---|
| 1 | MS supports PS based SMS |

As illustrated in Table 10, a selected bit in a selected octet of the IE can be a PS based SMS Support (PSSS) message. In this example, a Bit value of 0 provides the message that the MS does not support PS based SMS. A Bit value of 1 provides the message that the MS supports PS based SMS and does CS registration only to receive SMS service via the CS domain. The IE illustrated in Table 10 can be included in the RAU Request message shown in FIG. 4.

Solution C

In this solution, one spare bit of the UE Network Capability IE of the RAU Request message is used to indicate UE PS-only capability to the network. This enables the network to be aware of the UE's intent to request CS registration only for obtaining SMS service via the CS domain. The changes to the UE Network Capability IE can be the same as those previously shown and described in Tables 5 and 6 of Solution C in the preceding paragraphs.

Solution D

In this solution, one spare bit of the Update Type IE of the RAU Request message is used to indicate the UE PS-only capability to the network. This enables the network to be aware of the UE's intent to request CS registration only for obtaining SMS service via the CS domain.

In accordance with one embodiment, the Update Type IE, which is defined in section 10.5.5.18 of 3GPP TS 24.008 can be configured to include a PS based SMS Support message, as follows.

TABLE 11

Update Type information element

| 8 | 7 | 6 | 5 | 4 | 3 | 2 | 1 | |
|---|---|---|---|---|---|---|---|---|
| Update type IEI | | | | FOR | SMS Only | Update Type value | | octet 1 |

TABLE 12

Update Type information element

Update type value (octet 1, bit 1 to 3)

| Bits | | |
|---|---|---|
| 2 | 1 | |
| 0 | 0 | RA updating |
| 0 | 1 | combined RA/LA updating |
| 1 | 0 | combined RA/LA updating with IMSI attach |
| 1 | 1 | Periodic updating |

SMS Only (octet 1, bit 3)

| Bit 3 | |
|---|---|
| 0 | MS does not support PS based SMS |
| 1 | MS supports PS based SMS |

Follow-on request (octet 1, bit 4)

| Bit 4 | |
|---|---|
| 0 | No follow-on request pending |
| 1 | Follow-on request pending |

Follow-on request pending is applicable only in Iu mode.

As illustrated in Tables 11 and 12, a bit value of 0 in Bit 3 of octet 1 provides the message that the MS does not support PS based SMS. A bit value of 1 provides the message that the MS supports PS based SMS. The IE illustrated in Table 11 and 12 can be included in the RAU Request message shown in FIG. 4.

3GPP Network Messaging

In order for a 2G/3G wireless network to provide PS based SMS support, the network can support SMS communication over the Non Access Stratum (NAS) layer. The network can provide an indication to a UE/MS if SMS over NAS is supported by the SGSN.

In addition, in a GSM network, when an MS is switched on, the International Mobile Subscriber Identity (IMSI) attach procedure is executed. This procedure is used to connect the MS with the Mobile Switching Center (MSC) and Visitor Location Register (VLR) to register the MS in the network. With the ability to perform PS based SMS, an MS/UE may no longer need to connect with the MSC.

Accordingly, an IMSI attach procedure is not needed. When the network is informed that an MS supports PS based SMS support, the network can then reject any IMSI attach request. The network can send an indication to the UE that the IMSI attach was rejected due to the PS-only service provisioning based on the UE capability and therefore, the UE shall not imitate any CS related procedures.

To accomplish this, an SGSN network feature supported IE in the Attach Accept message defined in the 3GPP TS 24.008 specification can be enhanced to include additional information. An example of the Attach Accept message is provided in FIG. 5. A proposed solution, referred to as Solution A, is provided in the proceeding paragraphs. This example is not intended to be limiting. A variety of messaging means may be used to allow the 3GPP network to communicate with the MS to identify the network's ability to perform SMS via GPRS, which is also referred to as SMS over NAS.

Solution A

In this solution, if an SGSN supports SMS over NAS then it can indicate the support to the UE in the Attach Accept message using a new Extended Network Feature Support IE. One example format of the new IE in the Attach Accept message is provided below.

The Extended Network Feature Support IE is to indicate whether certain features are supported by the network. The EPS Extended Network Feature Support IE can be coded as shown in Tables 13 and 14.

TABLE 13

EPS Extended Network Feature Support information element

| 8 | 7 | 6 | 5 | 4 | 3 | 2 | 1 | |
|---|---|---|---|---|---|---|---|---|
| Extended Network feature support IEI | | | | 0 Spare | 0 Spare | 0 Spare | PSSS | octet 1 |

TABLE 14

EPS Extended Network Feature Support information element
PS based SMS Support (PSSS) (octet 1)

| Bit 1 | |
|---|---|
| 0 | SMS over NAS not supported |
| 1 | SMS over NAS supported |

Bit 1 set to 1 indicates SMS over NAS is supported by SGSN
Bits 4 to 2 of octet 1 are spare and shall be all coded as zero.

As illustrated in Tables 13 and 14, Bit 1 in octet 1 can be a PS based SMS Support (PSSS) message in the Extended Network Support IE. In this example, a Bit value of 0 provides the message that the SMS over NAS is not supported by the SGSN. A Bit value of 1 provides the message that SMS over NAS is supported by the SGSN. The IE illustrated in Table 13 and 14 can be included in the Attach Accept message communicated from the SGSN to the MS. In one embodiment, the network can use the Extended Network Support IE in order to inform the MS about the support of specific features, such as the delivery of SMS via GPRS. The MS may use the GPRS-SMS indication in the Attach Request in order to obtain SMS. If the network supports delivery of SMS via GPRS and this delivery is enabled, then the network can include the Extended Network Support IE in the Attach Accept message illustrated in FIG. 5 and set a GPRS-SMS indicator.

While an example has been provided to illustrate communication from the EPS to the UE to communicate the network's ability to perform PS based SMS support via the Attach Accept message, this is not intended to be limiting. There are also additional ways in which this information can be communicated.

RAU Accept Message

For example, enhancements, similar to those shown in Solution A can be made to the Routing Area Update Accept Message described in section 9.4.15 of 3GPP TS 24.008. The RAU Update Accept message can be used by the network to indicate if SMS over NAS is supported by the SGSN. It also indicates that IMSI attach was rejected due to PS-Only service provisioning based on UE capability and therefore the UE will not imitate any CS related procedures. The following enhancements can be made to the RAU Accept message in TS 24.008.

The RAU accept message is sent by the network to the MS to provide the MS with GPRS mobility management related data in response to the RAU request message. Table 9.4.15/3GPP of TS 24.008 provides an example. An example is also provided in FIG. 6. The RAU Accept message illustrated in FIG. 6 includes a plurality of IEIs, the type of each IEI listed, and a reference for the IEI to 3GPP TS 24.008. The presence, format, and length of each IEI is also listed, as can be appreciated.

If the SGSN supports the SMS over NAS feature, then it can be indicated using the RAU Accept message. One proposed solution, referred to as Solution A, is provided in the proceeding paragraphs. This example is not intended to be limiting. A variety of messaging means, including IEs listed in the RAU Accept message of FIG. 6 may be used to allow the 3GPP network to communicate with the MS to identify the network's ability to perform SMS via GPRS, also referred to as SMS over NAS. In addition, newly defined IEs communicated using the RAU Accept message may also be used to communicate the network's ability to perform SMS via GPRS.

Solution A

If the SGSN supports the SMS over NAS feature then it can be indicated to the UE in the RAU accept message using a new Extended Network Feature Supported IE. The format of the new Extended Network Feature Supported IE in the RAU Accept message can be the same as that described with respect to Tables 13 and 14 above. The network can also use the Extended Network Feature Supported IE in order to inform the MS about the support of specific features such as the delivery of SMS via GPRS (GPRS-SMS) or implicitly by not sending it. The MS may use the GPRS-SMS indication in order to obtain SMS.

GMM Cause Value

An MS can perform a combined attach to attach for both GPRS services and non-GPRS services, such as a CS attach to an MSC. In one embodiment, when an MS requests a combined attach, while indicating support for PS based SMS, and the network also supports SMS over NAS (i.e. SMS via GPRS), the network can send a message to the UE indicating that the connection to the MSC was not performed because it was not needed since both the MS and network support PS based SMS. This can be accomplished using a GPRS mobility management message (GMM) as described in the proceeding paragraphs. Any number of different GMM codes may be used.

In addition to the PSSS message from the SGSN to the MS, a GPRS mobility management (GMM) message can be communicated from the SGSN to the MS. The GMM message may be communicated in an IE. The purpose of the GMM cause IE is to indicate the reason why a GMM request from the MS Is rejected by the network. If an MS indicates its support for PS-only inside the Attach Request message, and if the network supports SMS over Gs (SMS over NAS) and PS-only subscription provisioning is set to PS-only-enforced or PS-only-Enabled, it will reject the IMSI attach by sending a new GMM cause value.

In this case, the GMM cause IE can be used to identify that an international mobile subscriber identity (IMSI) attach is rejected as PS only is supported and the SGSN network supports SMS over the NAS. Accordingly, no IMSI attach is necessary, as previously discussed. The GMM cause IE is a type 3 IE with 2 octets length. The GMM cause value is defined in section 10.5.5.14 of 3GPP TS 24.008. One example of a new GMM cause value is shown in Table 15 and in FIG. 7.

TABLE 15

| GMM cause information element | |
|---|---|
| 8 7 6 5 4 3 2 1 | |
| GMM cause IEI | octet 1 |
| Cause value | octet 2 |

As shown in FIG. 7, when bits 1 to 8 have a value of 01110000, respectively, (Cause value=112) then the IMSI attach is rejected as PS-only-Enabled. This cause is sent to the MS if the MS requests services that require the SGSN to perform combined MM procedures for the MS and to establish a Gs association. A cause code "IMSI attach rejected as PS-only-Enabled" can be communicated. When bits 1 to 8 have a value of 01110001, respectively, (Cause value=113) then the IMSI attach is rejected as PS-only-Enforced and the network supports SMS over Gs (NAS). This cause is sent to the MS if the MS requests SMS services that the HPLMN of the MS is not able and willing to provide via the PS domain. When this occurs, then the cause code "IMSI attach rejected as PS-only-Enforced and network supports SMS over Gs (NAS)" is provided, as shown in FIG. 7. While GMM cause codes 112 and 113 have been provided as examples, they are not intended to be limiting. Substantially any type of GMM cause code can be used to convey information from the network to the MS that explains that a non-GPRS attachment is not performed because SMS via GPRS can be accomplished at both the MS and the network.

Figure 8:
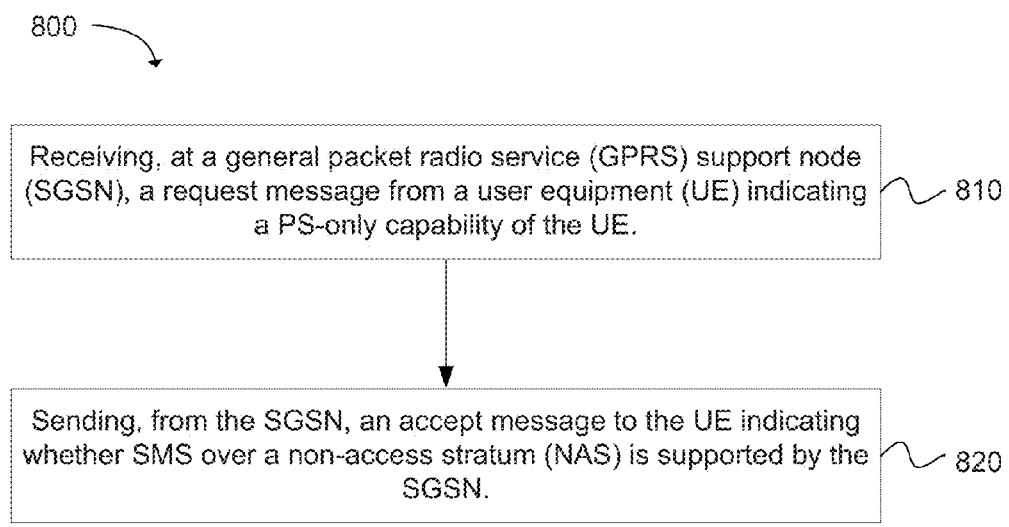
FIG. 8 depicts a flow chart of a method for performing Packet Service (PS) only service provisioning in a wireless network in accordance with an example.

In another example embodiment, a method 800 for performing Packet Service (PS) only service provisioning in a wireless network is disclosed, as depicted in the flow chart of FIG. 8. The method comprises receiving, at a general packet radio service (GPRS) support node (SGSN), a request message from a user equipment (UE) indicating a PS-only capability of the UE, as shown in block 810; and sending, from the SGSN, an accept message to the UE indicating whether SMS over a non-access stratum (NAS) is supported by the SGSN, as shown in block 820. The request message can be an attach request message or a routing area update request message. Similarly, the accept message can be an attach accept message or a routing area accept message.

The method 800 can further comprise indicating in an attach accept message or a routing area update accept message that an international mobile subscriber identity (IMSI) attach is only for SMS. A GRPS mobility management (GMM) message can be sent from the SGSSN to the UE. The GMM message can identify that an international mobile subscriber identity (IMSI) attach is rejected as PS only is supported and the GPRS network supports SMS over the NAS. The GMM message can be sent in one of an attach accept message and a routing area update accept message.

The method 800 can further comprise receiving an attach request message or a routing area update request message, wherein the attach request message or the routing area update request message comprises an information element (IE) having a selected bit set to indicate if the UE supports PS based SMS and performs the CS registration only to receive SMS service via the CS domain. The request message may be received from the UE in an Additional Update Type information element that is contained in one of the attach accept message and the routing area update accept message.

The method 800 can further comprise sending the attach accept message or the routing area update accept message to the UE, wherein the attach accept message or the routing area update accept message comprises an (IE) using a selected bit in the IE to identify if SMS over NAS is supported or is not supported by the SGSN network.

Figure 9:
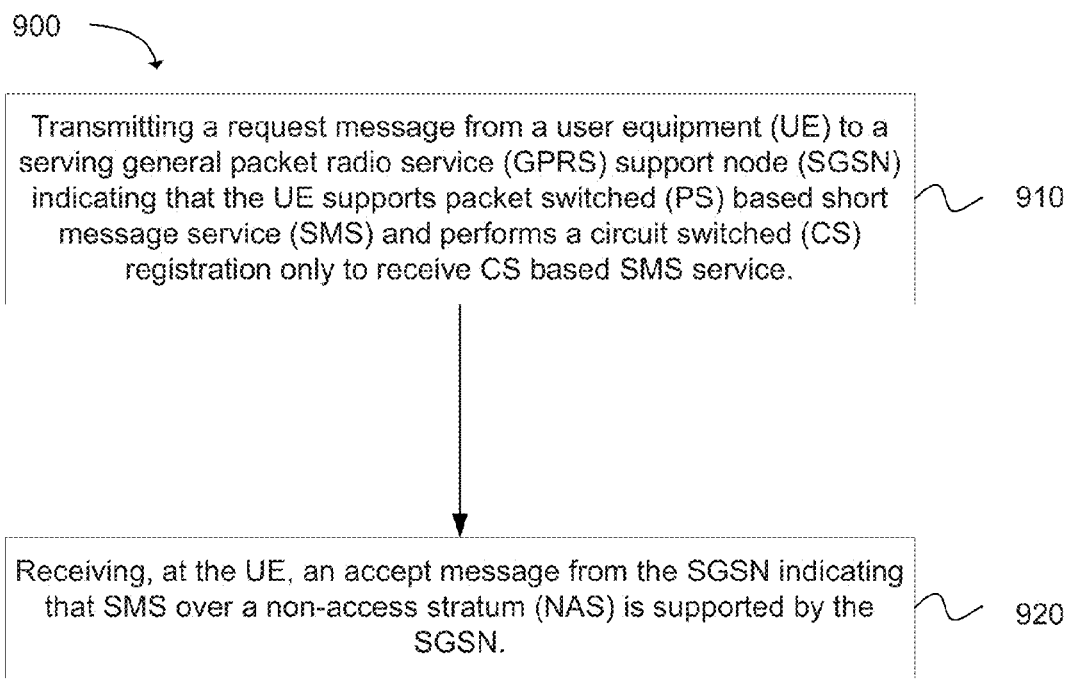
FIG. 9 depicts a flow chart of a method for adapting a wireless network for PS communication of a short message service (SMS) message in accordance with an example.

In another embodiment, a method 900 for adapting a wireless network for packet switched (PS) communication of a short message service (SMS) message is described, as depicted in the flow chart of FIG. 9. The method comprises transmitting a request message from a user equipment (UE) to a serving general packet radio service (GPRS) support node (SGSN) indicating that the UE supports packet switched (PS) based short message service (SMS) and performs a circuit switched (CS) registration only to receive CS based SMS service, as shown in block 910; and receiving, at the UE, an accept message from the SGSN indicating that SMS over a non-access stratum (NAS) is supported by the SGSN, as shown in block 920.

The method 900 can further comprise transmitting the request message, wherein the request message is one of an attach request message and a routing area update request message. An additional operation can include sending, from the SGSN, a GPRS mobility management (GMM) message identifying a cause code that an international mobile subscriber identity (IMSI) attach is rejected as PS only is supported and the SGSN network supports SMS over the NAS.

The operation of transmitting the request message in the method 900 can further comprise transmitting an attach request message or a routing area update request message, wherein the attach request message or the routing area update request message comprises an information element (IE) having a selected bit set to indicate if the UE supports PS based SMS and performs the CS registration only to receive SMS service via the CS domain. The information element can be an additional update type information element that is communicated from the UE to the SGSN in one of the attach request message or the routing area update request message.

The operation of receiving the accept message at the UE from the SGSN, in the method 900, can further comprise receiving an attach accept message or a routing area update accept message at the UE, wherein the attach accept message or the routing area update accept message comprises an (IE) using a selected bit in the IE to identify if SMS over NAS is supported or is not supported by the SGSN network.

Figure 10:
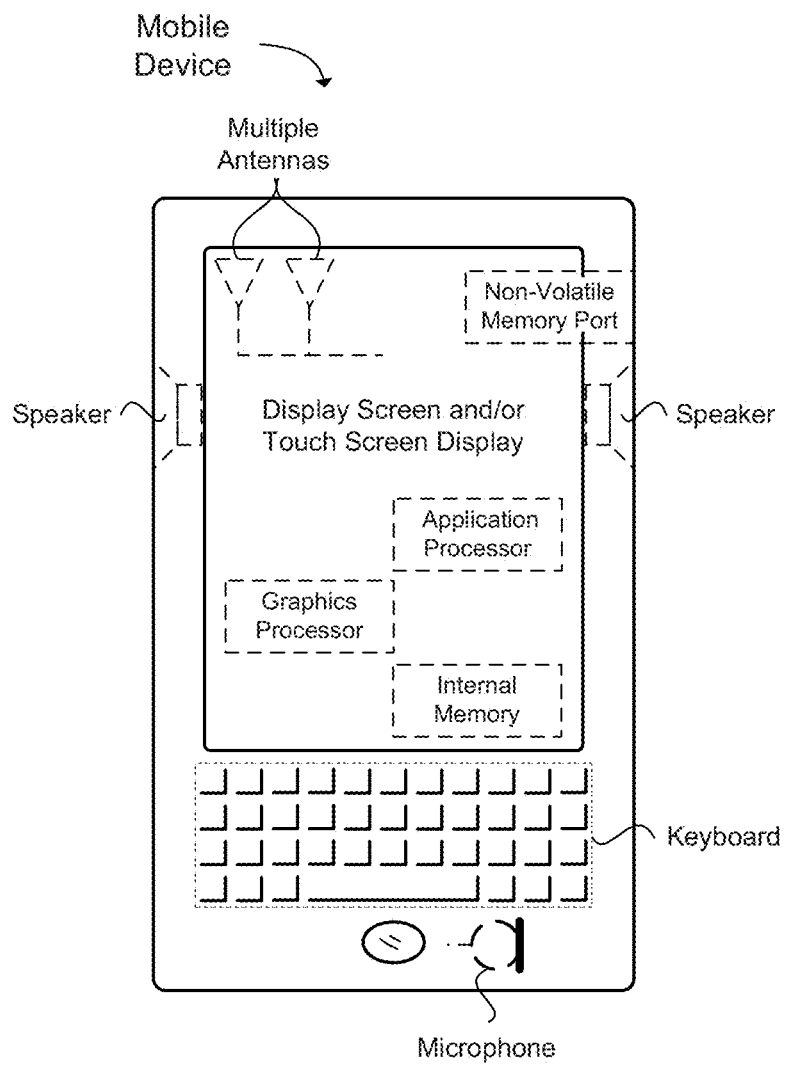
FIG. 10 illustrates a mobile wireless device in accordance with an example.

FIG. 10 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

In another embodiment, a serving general packet radio service (GPRS) support node (SGSN) configured to communicate with a user equipment (UE) adapted for packet switched (PS) communication of a short message service (SMS) message is disclosed. The SGSN comprises a PS support module operable at the SGSN, as shown in FIG. 2. The PS support module is configured to: receive a request message from a UE indicating that the UE supports PS based SMS and performs a circuit switched (CS) registration only to receive SMS service via a CS domain; and send an accept message to the UE indicating that SMS over a non-access stratum (NAS) is supported by the SGSN. The request message can be one of an attach request message and a routing area update request message. The accept message can be one of an attach accept message and a routing area update accept message.

In one embodiment, the PS support module can be further configured to transmit a GPRS mobility management (GMM) message identifying a cause code that an international mobile subscriber identity (IMSI) attach is rejected as PS only is supported and the SGSN network supports SMS over the NAS.

The operation of receiving the request message from the UE can further comprise receiving an attach request message or a routing area update request message, wherein the attach request message or the routing area update request message comprises an additional update type information element (IE) having a selected bit set to indicate if the UE supports PS based SMS and performs the CS registration only to receive SMS service via the CS domain.

The operation of sending the accept message can further comprise sending an attach accept message or a routing area update accept message to the UE, wherein the attach accept message or the routing area update accept message comprises an (IE) using a selected bit in the IE to identify if SMS over NAS is supported or is not supported by the SGSN network.

FIG. 10 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 10 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for performing Packet Service (PS) only service provisioning in a wireless network, comprising:
receiving, at a serving general packet radio service (GPRS) support node (SGSN), a request message from a mobile station (MS) indicating that the MS supports PS based short messaging service (SMS) and performs a circuit switched (CS) registration only to receive SMS service via a CS domain, wherein the request message comprises an information element (IE) having a selected bit set to indicate whether or not the MS supports PS based SMS and performs the CS registration only to receive SMS service via the CS domain, wherein the SGSN is configured to send a request for CS registration received from the MS to a mobile switching center (MSC) when the MS does not support PS based SMS; and sending, from the SGSN, an accept message to the MS indicating whether SMS over a non-access stratum (NAS) is supported by the SGSN, wherein the accept message comprises an IE using a bit in the IE to identify if SMS over NAS is supported or is not supported by the SGSN.

2. The method of claim 1, wherein the request message is an attach request message.

3. The method of claim 1, wherein the request message is a routing area update request message.

4. The method of claim 1, wherein the accept message is an attach accept message.

5. The method of claim 1, wherein the accept message is a routing area update accept message.

6. The method of claim 1, further comprising indicating in an attach accept message or a routing area update accept message that an international mobile subscriber identity (IMSI) attach is only for SMS.

7. The method of claim 1, further comprising sending, from the SGSN to the MS, a GPRS mobility management (GMM) message identifying that an international mobile subscriber identity (IMSI) attach is rejected because PS only is supported by the MS and the GPRS network supports SMS over the NAS.

8. The method of claim 7, further comprising sending from the SGSN to the MS the GMM message in one of an attach accept message and a routing area update accept message.

9. The method of claim 1, further comprising receiving the request message from the MS in an Additional Update Type information element contained in one of an attach accept message and a routing area update accept message.

10. The method of claim 1, further comprises receiving the request message from the MS at the SGSN, wherein the request message is communicated from the MS to the SGSN via a radio network controller (RNC).

11. The method of claim 1, wherein the MS includes at least one of an antenna, a touch sensitive display screen, a speaker, a microphone, a graphics processor, an application processor, internal memory, a non-volatile memory port, and combinations thereof.

12. A non-transitory machine readable storage medium comprising a plurality of instructions adapted to be executed to implement a method for adapting a wireless network for packet switched (PS) communication of a short message service (SMS) message, comprising:

transmitting a request message from a mobile station (MS) to a serving general packet radio service (GPRS) support node (SGSN) indicating that the MS supports packet switched (PS) based short message service (SMS) and performs a circuit switched (CS) registration only to receive CS based SMS service, wherein the request message comprises an information element (IE) having a selected bit set to indicate if the MS supports PS based SMS and performs the CS registration only to receive SMS service via the CS domain, wherein the SGSN is configured to send a request for CS registration received from the MS to a mobile switching center (MSC) when the MS does not support PS based SMS;

receiving, at the MS from the SGSN, an accept message indicating that SMS over a non-access stratum (NAS) is supported by the SGSN, wherein the attach message comprises an (IE) using a selected bit in the IE to identify if SMS over NAS is supported or is not supported by the SGSN.

13. The non-transitory machine readable storage medium of claim 12, further comprising transmitting the request message, wherein the request message is one of an attach request message and a routing area update request message.

14. The non-transitory machine readable storage medium of claim 12, further comprising sending, from the SGSN, a GPRS mobility management (GMM) message identifying a cause code that an international mobile subscriber identity (IMSI) attach is rejected because PS only is supported by the MS and the SGSN network supports SMS over the NAS.

15. The non-transitory machine readable storage medium of claim 12, wherein the information element is an additional update type information element that is communicated from the MS to the SGSN in one of the attach request message or the routing area update request message.

16. A serving general packet radio service (GPRS) support node (SGSN) configured to communicate with a mobile station (MS) adapted for packet switched (PS) communication of a short message service (SMS) message, the SGSN comprising one or more processors and memory configured to:

receive a request message from a MS indicating that the MS supports PS based SMS and performs a circuit switched (CS) registration only to receive SMS service via a CS domain, wherein the request message comprises an additional update type information element (IE) having a selected bit set to indicate if the MS supports PS based SMS and performs the CS registration only to receive SMS service via the CS domain, wherein the SGSN is configured to send a request for CS registration received from the MS to a mobile switching center (MSC) when the MS does not support PS based SMS; and send an accept message to the MS containing an extended network feature supported information element (IE) that indicates that SMS over a non-access stratum (NAS) is supported by the SGSN, wherein the accept message comprises an (IE) using a selected bit in the IE to identify if SMS over NAS is supported or is not supported by the SGSN.

17. The SGSN of claim 16, wherein the request message is one of an attach request message and a routing area update request message.

18. The SGSN of claim 16, wherein the accept message is one of an attach accept message and a routing area update accept message.

19. The SGSN of claim 16, further configured to transmit a GPRS mobility management (GMM) message identifying a cause code that an international mobile subscriber identity (IMSI) attach is rejected as PS only is supported and the SGSN network supports SMS over the NAS.

20. The SGSN of claim 16, wherein the SGSN is configured to communicate with the MS via a radio network controller (RNC).

* * * * *